B. FORD.
FISH HOOK.
APPLICATION FILED SEPT. 30, 1915.

1,283,718.

Patented Nov. 5, 1918.

WITNESS:

INVENTOR
Bruce Ford
BY
Augustus B. Stoughton,
ATTORNEY.

UNITED STATES PATENT OFFICE.

BRUCE FORD, OF PHILADELPHIA, PENNSYLVANIA.

FISH-HOOK.

1,283,718.  Specification of Letters Patent.  Patented Nov. 5, 1918.

Application filed September 30, 1915. Serial No. 53,282.

*To all whom it may concern:*

Be it known that I, BRUCE FORD, a citizen of the United States, residing at the city of Philadelphia, in the county of Philadelphia and State of Pennsylvania, have invented certain new and useful Improvements in Fish-Hooks, of which the following is a specification.

The principal object of the invention is to prevent the escape of fish from the hook upon which they are caught, and the invention, stated in general terms, consists in a novel arrangement of the barb in respect to the plane of the hook, and in a new combination of the parts of a duplex hook by which the hook operates in a new and improved way and crowds and spring presses the meat of a hooked fish upon the barbs of the hook whereby the escape of the fish is opposed and prevented.

The invention further comprises the improvements to be presently described and finally claimed.

Figure 1:
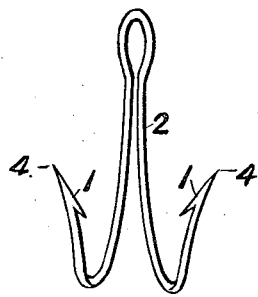
Figure 2:
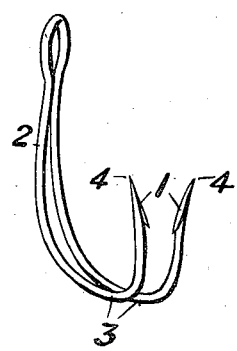
Figure 3:
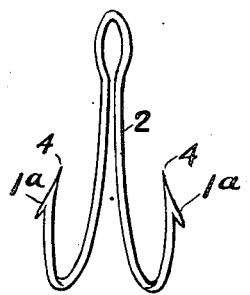
Figure 4:
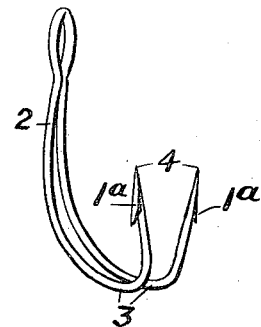

In the drawings Figure 1, is a front, and Fig. 2, a perspective view of a hook embodying features of the invention, and Figs. 3 and 4, are similar views of a hook embodying a modification of the invention.

The barbs 1, Figs. 1 and 2, and 1ª, Figs. 3 and 4, are disposed in substantially the same plane and this plane is at right angles to the plane of the hook and is substantially parallel with, but is spaced from, the plane of the shank 2, by the distance of the span of the bend 3. The points 4, of the hook lie in the same plane as the barbs but are preferably inclined away from the respective barbs. In Figs. 1 and 2, the points 4, are divergent and the barbs 1, point toward each other, whereas in Figs. 3 and 4, the points 4, are convergent and the barbs point away from each other. The shank may be constructed as a spring, for example, by doubling it on itself and spacing its arms apart, thus assisting the tendency to return the barbs to the position shown against any pressure that may tend to separate them in Fig. 1, or to bring them together in Fig. 3. The inclination of the points away from their respective barbs operates upon the meat of fish, caught upon the hook, to bring about this spring action and so the meat is crowded and spring pressed by the barbs and escape of the fish is thereby prevented. In the construction of Figs. 1 and 2, the diverging points tend to crowd the meat between them, and the spring shank causes the barbs to spring press the crowded meat. In the construction shown in Figs. 3 and 4, the converging points tend to crowd the meat away from the hook and the spring shank spring presses the barbs into the crowded meat.

The fact that each barb is at right angles to the plane of the hook, or more accurately to the plane of the bend of the hook, is advantageous, because if the barb is buried in the meat of the fish's mouth or gullet, the side of the bend of the hook serves to guide a knife blade toward the barb and so facilitates the process of getting the hook out of the meat.

The plane of the shank is in the plane in which the shank substantially lies, for example, in Figs. 1 and 3, it is the plane of the paper, and in Figs. 2 and 4, it is a plane oblique to the plane of the paper and toward the left. The plane of the hook is the plane in which the hook bills lie that is in Figs. 1 and 3, a plane parallel to the plane of the paper but spaced in front of the face of the paper and in Figs. 2 and 4, a plane passing through the bills of the hooks and oblique to the plane of the paper and toward the right. The plane of the barbs in part coincides with the plane of the hook.

What I claim is:

1. A duplex fish hook having a spring shank and having its barbs disposed in a plane substantially parallel with and spaced from the plane of its shank and having its points inclined away from their barbs whereby the meat of a fish is crowded and spring pressed by the barbs in respect to each other.

2. A duplex fish hook having its barbs pointed toward each other and disposed in a single plane spaced from the plane of its shank and having divergent points disposed in the first mentioned plane, whereby the meat of a fish is crowded and spring pressed between the barbs, substantially as described.

3. A duplex fish hook having its barbs disposed in substantially one plane spaced from the plane of its shank and having its points inclined away from their barbs, whereby the meat of a fish is crowded and spring pressed by the barbs in respect to each other.

4. A duplex fish hook having its barbs opposingly arranged in substantially the same single plane and at right angles to the plane of the hook, substantially as described.

In testimony whereof I have hereunto signed my name.

BRUCE FORD.

Witness:
CLIFFORD K. CASSEL.